Feb. 7, 1928.
W. NILSON
CULTIVATOR ATTACHMENT
Filed Feb. 11, 1927
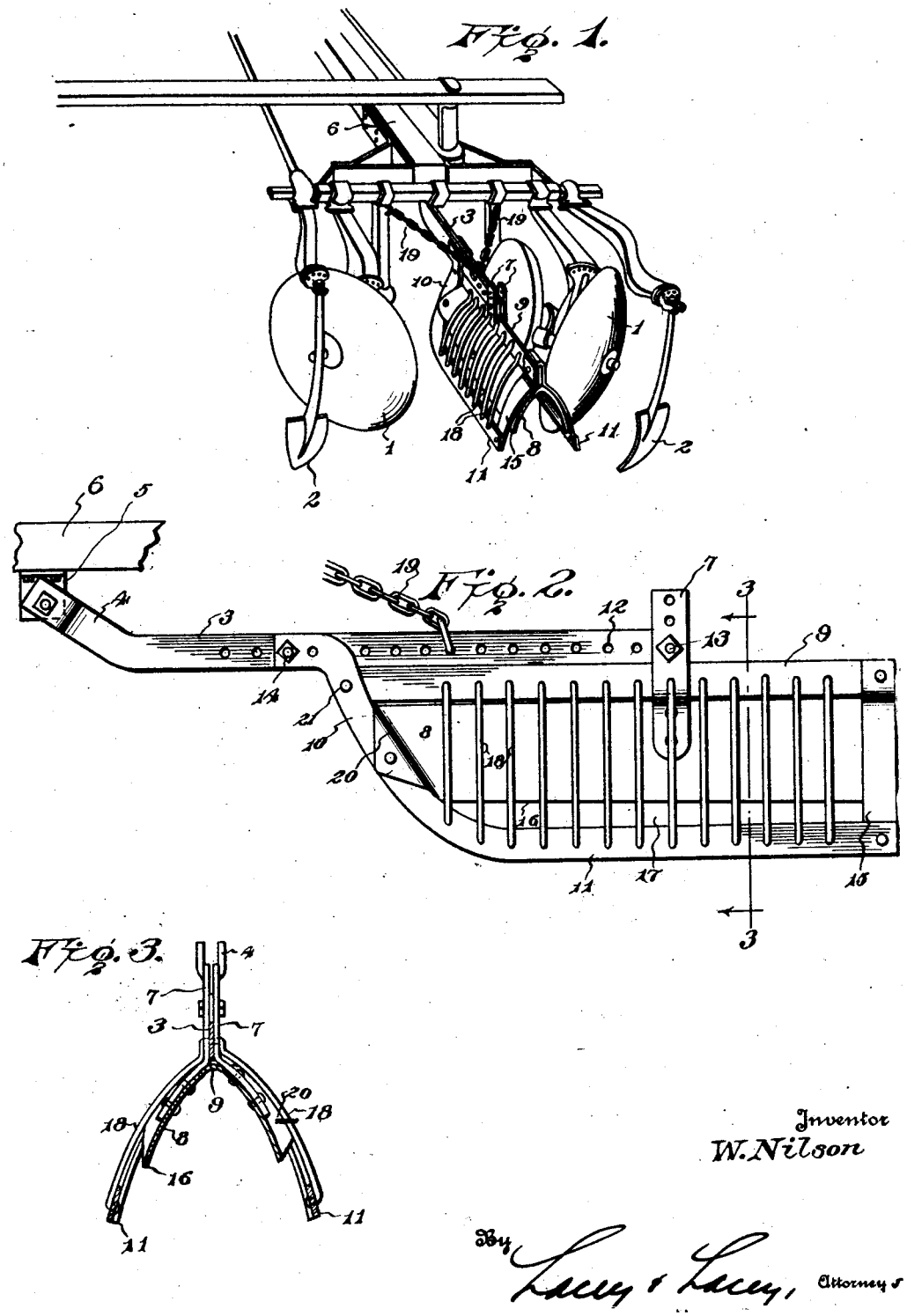
Inventor
W. Nilson
By Lacey & Lacey, Attorneys Patented Feb. 7, 1928.

1,658,298

UNITED STATES PATENT OFFICE.

WALFRED NILSON, OF MINDEN, NEBRASKA.

CULTIVATOR ATTACHMENT.

Application filed February 11, 1927. Serial No. 167,536.

This invention relates to agricultural implements and has for its object the provision of an attachment for cultivators whereby the loose dirt turned over by a cultivator will be permitted to collect around the roots and the lower portion of the stems of young plants but will be prevented from covering the plants so as to smother the same. The invention is illustrated in the accompanying drawing and consists in certain novel features which will be hereinafter first fully described and then particularly pointed out in the appended claims.

In the drawing:

Figure 1 is a perspective view of the device in position for use;

Fig. 2 is an enlarged side elevation of the attachment, and

Fig. 3 is a section on the line 3—3 of Fig. 2.

The device of my invention may be employed in connection with any form of cultivator and in Fig. 1 is shown mounted upon a cultivator having gangs of rolling disks 1 as well as shovels 2, the disks being so arranged that as the cultivator is drawn forward along a row of plants the soil at the sides of the row will be loosened and thrown toward the row so as to form a fine mulch along the ridge. In carrying out the invention, there is provided a draft bar 3 which is formed with a fork 4 at its front end whereby it may be pivotally connected to a bracket 5 on the under side of the pole 6 of the cultivator. This draft is attached at its rear end to posts 7 disposed at opposite sides of the draft bar and having their lower ends diverging to be riveted or otherwise firmly secured to a hood or shield 8. The said shield or hood is substantially A shape in cross section having diverging side members, and over its ridge is a bar 9 passing between the posts 7 and secured at its front end to the upturned front extremities 10 of runners 11. The upturned ends of the runners are secured to the opposite sides of the draft bar 3 and said bar is provided with a longitudinal series of openings 12 therethrough whereby the bolts 13 and 14 securing the draft bar to the posts 7 and to the runners, respectively, may be adjusted so as to obtain the desired draft and also set the device in proper relation to the ground-engaging elements of the cultivator. A bracing member 15 is secured to the rear end of the bar 9 and extends downwardly and outwardly therefrom so as to pass over the rear end of the hood or shield and be secured to the rear extremities of the runners, as shown. The lower edge 16 of the shield is disposed in vertically spaced relation to the surface of the ground and to the runners so that there is an open space, shown at 17 in Fig. 2, through which the dirt may pass under the hood to reach the roots of the plants while the loose dirt which may be thrown higher by the cultivating shovels or disks will fall upon the shield and will be thereby prevented from covering the plants but permitted to fall to the ground at the sides of the same. I also provide a screen consisting of vertically disposed spaced rods 18 extending from the runners to the bar 9 so that any clods which may possibly be thrown up by the ground-engaging elements will be prevented from passing to the plants and will be broken up by the said rods and, consequently, the soil will be reduced to a fine mulch.

In order that the attachment may be held against excessive lateral movement which might result in damage to the young plants, I provide draft chains 19 which are attached to the draft bar 3 at a point in rear of the upturned front ends of the runners and extend forwardly in divergent relation to some fixed part of the cultivator, such as the standards of the front cutters.

The shield or hood is carried by the posts 7 at an intermediate point of its length, and the front ends of the shield are bent outwardly, as shown at 20, whereby to rest against the outer sides of the upturned ends of the runners and be secured thereto. The front end of the bar 9 is also bolted to the runners, as indicated at 21, and the rods 18 may be continuous from runner to runner with their central portions passed through openings provided therefor in the bar 9, as will be understood. The device is exceedingly simple in construction and may be readily applied to any cultivator without materially increasing the draft of the same and will prove highly efficient for the purposes for which it is designed.

Having thus described the invention, I claim:

1. An attachment for cultivators comprising a pair of runners, a draft bar connected to the front ends of the runners, a hood connected to the runners and to the draft bar between the runners to span a row of plants the lower edges of the hood being spaced vertically above the respective runners, and pulverizing screens carried by the runners and bridging the spaces between the same and the hood.

2. An attachment for cultivators comprising a draft bar, runners attached to the draft bar, a hood carried by the runners and having its lower edges above the runners, a supporting member rising from the hood intermediate the ends thereof and secured to the draft bar, and vertically disposed parallel rods extending over the hood and having their lower ends secured to the respective runners.

In testimony whereof I affix my signature.

WALFRED NILSON. [L. S.]